United States Patent
Kim et al.

(10) Patent No.: US 8,693,800 B2
(45) Date of Patent: Apr. 8, 2014

(54) IMAGE PROCESSING DEVICE, PROCESSING METHOD THEREOF, AND IMAGE PROCESSING SYSTEM HAVING THE SAME

(75) Inventors: Young Duk Kim, Hwaseong-si (KR); Tae Sun Kim, Seongnam-si (KR); Jae Hong Park, Seongnam-si (KR); Jae Hoe Yang, Seoul (KR); Sang Hoon Lee, Seoul (KR); Kyoung Mook Lim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/493,258

(22) Filed: Jun. 11, 2012

(65) Prior Publication Data

US 2012/0314970 A1 Dec. 13, 2012

(30) Foreign Application Priority Data

Jun. 9, 2011 (KR) .................. 10-2011-0055389

(51) Int. Cl.
*G06K 9/40* (2006.01)

(52) U.S. Cl.
USPC .................... 382/264; 382/260; 382/218

(58) Field of Classification Search
USPC ......... 382/168, 260, 264, 218, 300, 174, 167, 382/254; 235/454, 455, 462.01; 356/450
See application file for complete search history.

(56) References Cited

U.S. PATENT DOCUMENTS

| 5,831,254 A | * | 11/1998 | Karpen et al. | ........... 235/454 |
| 6,254,003 B1 | * | 7/2001 | Pettinelli et al. | ....... 235/454 |
| 7,760,943 B2 | * | 7/2010 | Shaked | ............... 382/174 |

* cited by examiner

*Primary Examiner* — Anh Do
(74) *Attorney, Agent, or Firm* — Sughrue Mion, PLLC

(57) ABSTRACT

An image processing device is provided. The image processing device includes a weighted low-pass filter which performs weighted low-pass filtering on illumination of sub-sampled pixel signals, and an illumination interpolation circuit which compares illumination of the weighted low-pass filtered pixel signals with illumination of current pixel signals and performs interpolation while applying a weight to illumination of the weighted low-pass filtered pixel signals according to the comparison result.

16 Claims, 6 Drawing Sheets

US 8,693,800 B2

IMAGE PROCESSING DEVICE, PROCESSING METHOD THEREOF, AND IMAGE PROCESSING SYSTEM HAVING THE SAME

CROSS-REFERENCE TO RELATED APPLICATION

This application claims priority under 35 U.S.C. §119(a) from Korean Patent Application No. 10-2011-0055389 filed on Jun. 9, 2011, the disclosure of which is hereby incorporated by reference in its entirety.

BACKGROUND

Apparatuses and methods consistent with exemplary embodiments relate to an image processing method of an image processing device, and more particularly, to an image processing device which may improve picture quality, an image processing method of the image processing device and an image processing system including the image processing device.

A dynamic range compression technique based on a Retinex algorithm is based on an image formation model in which a human visual system recognizes an image.

In the Retinex algorithm, when an output signal of a recognized pixel is Y, an illumination element is I, and a reflectance element is R, Y is calculated by multiplying I and R.

That is, $Y = I \times R$.

The illumination element, I, may be a low-band signal which is little spatially changed, and the reflectance element, R may be a high frequency component as reflectance of an object.

SUMMARY

According to an aspect of an exemplary embodiment an image processing method includes: generating and outputting a sub-sampled illumination signal based on an input luminance signal, performing weighted low-pass filtering on the sub-sampled illumination signal and outputting a weighted low-pass filtered illumination signal, and comparing the weighted low-pass filtered illumination signal with the input luminance signal and performing interpolation while applying a weight to the weighted low-pass filtered illumination signal according to a result of the comparing.

According to an aspect of another exemplary embodiment, the performing the weighted low-pass filtering comprises applying a weight, which is in inverse proportion to a distance between a sub-pixel associated with the sub-sampled illumination signal and a center sub-pixel, to the sub-sampled illumination signal.

According to an aspect of another exemplary embodiment, the performing the weighted low-pass filtering comprises applying a weight, which is in inverse proportion to an illumination difference between the sub-sampled illumination signal and a sub-sampled illumination signal output from a center sub pixel, to the sub-sampled illumination signal.

According to an aspect of another exemplary embodiment, the image processing method further includes setting a weight of the weighted low-pass filter.

According to an aspect of another exemplary embodiment, the weight applied by the weighted illumination interpolation circuit is in inverse proportion to distance between a location of the sub-sampled illumination signal and a current pixel outputting the input luminance signal a1.

According to an aspect of another exemplary embodiment, the weight applied by the weighted illumination interpolation circuit is in inverse proportion to an absolute value of a difference between an illumination of the weighted low-pass filtered illumination signal and a luminance of the input luminance signal output from a current pixel.

The image processing method of the image processing device further includes setting the weight of the weighed illumination interpolation circuit.

According to an aspect of another exemplary embodiment, to an image processing device includes: a sub-sampling illumination generator which generates and outputs a sub-sampled illumination signal based on an input luminance signal, a weighted low-pass filter which performs weighted low-pass filtering on the sub-sampled illumination signal and outputs a weighted low-pass filtered illumination signal, and a weighted illumination interpolation circuit which compares the weighted low-pass filtered illumination signal with the input luminance signal and performs interpolation while applying a weight to the weighted low-pass filtered illumination signal according to a result of the comparison.

According to an aspect of another exemplary embodiment, the weighted low-pass filter performs weighted low-pass filtering on the sub-sampled illumination signal by applying weight, which is in inverse proportion to a distance between a sub pixel associated with the sub-sampled illumination signal and a center sub-pixel, to the sub-sampled illumination signal.

According to an aspect of another exemplary embodiment, the weighted low-pass filter performs weighted low-pass filtering by applying a weight, which is in inverse proportion to an illumination difference between the sub-sampled illumination signal and a sub-sampled illumination signal output from a center sub-pixel, to the sub-sampled illumination signal.

According to an aspect of another exemplary embodiment, the weighted illumination interpolation circuit performs interpolation while applying a weight, which is in inverse proportion to a distance between a sub pixel associated with the sub-sampled illumination signal and a current pixel outputting the input luminance signal, to the weighted low-pass filtered illumination signal.

According to an aspect of another exemplary embodiment, the weighted illumination interpolation circuit performs interpolation while applying a weight, which is in inverse proportion to an absolute value of a difference between an illumination of the weighted low-pass filtered illumination signal and a luminance of the input luminance signal, to the weighted low-pass filtered illumination signal.

According to another aspect of an exemplary embodiment an image processing system includes an image sensor and the image processing device processing a signal received from the image sensor.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
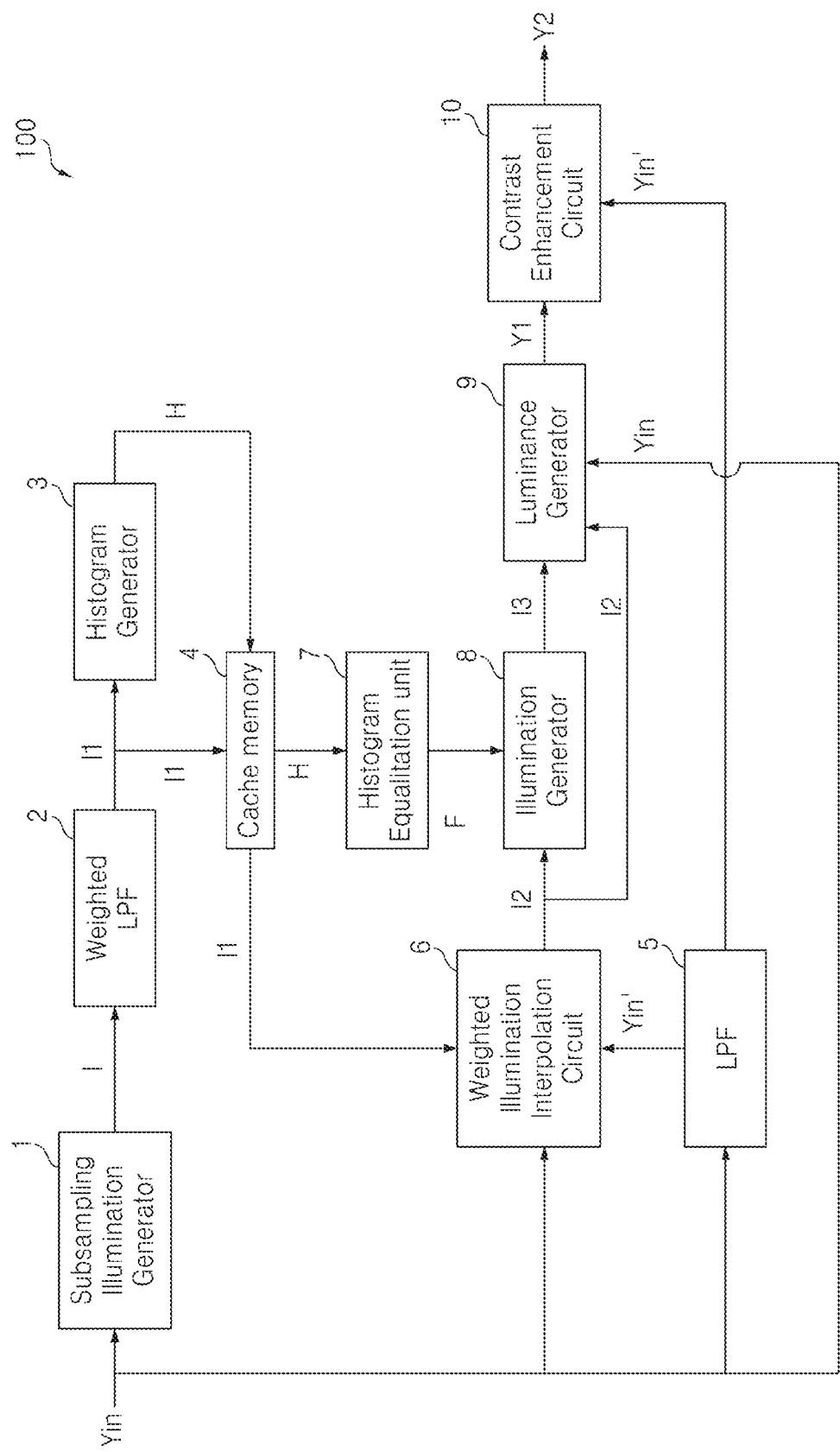
FIG. 1 is a block diagram for explaining a concept of an image processing device according to an exemplary embodiment.

Reference will now be made in detail to exemplary embodiments illustrated in the accompanying drawings, wherein like reference numerals refer to the like elements throughout. Exemplary embodiments are described below in order to explain the present general inventive concept by referring to the figures.

FIG. 1 is a schematic block diagram for explaining a concept of an image processing device according to an exemplary embodiment. Referring to FIG. 1, the image processing device 100 includes a sub-sampling illumination generator 1, a weighted low pass filter 2, a histogram generator 3, a cache memory 4, a histogram equalization unit 7, a weighted illumination interpolation circuit 6, an illumination generator 8, a luminance generator 9 and a contrast enhancement circuit 10.

According to an exemplary embodiment, the image processing device 100 may further include a low-pass filter 5. The low-pass filter 5 may perform low-pass filtering on an input luminance signal Yin and output a low-pass filtered input luminance signal Yin'. The sub-sampling illumination generator 1 outputs a sub-sampled illumination signal I from an input luminance signal Yin of an input image.

Figure 2:
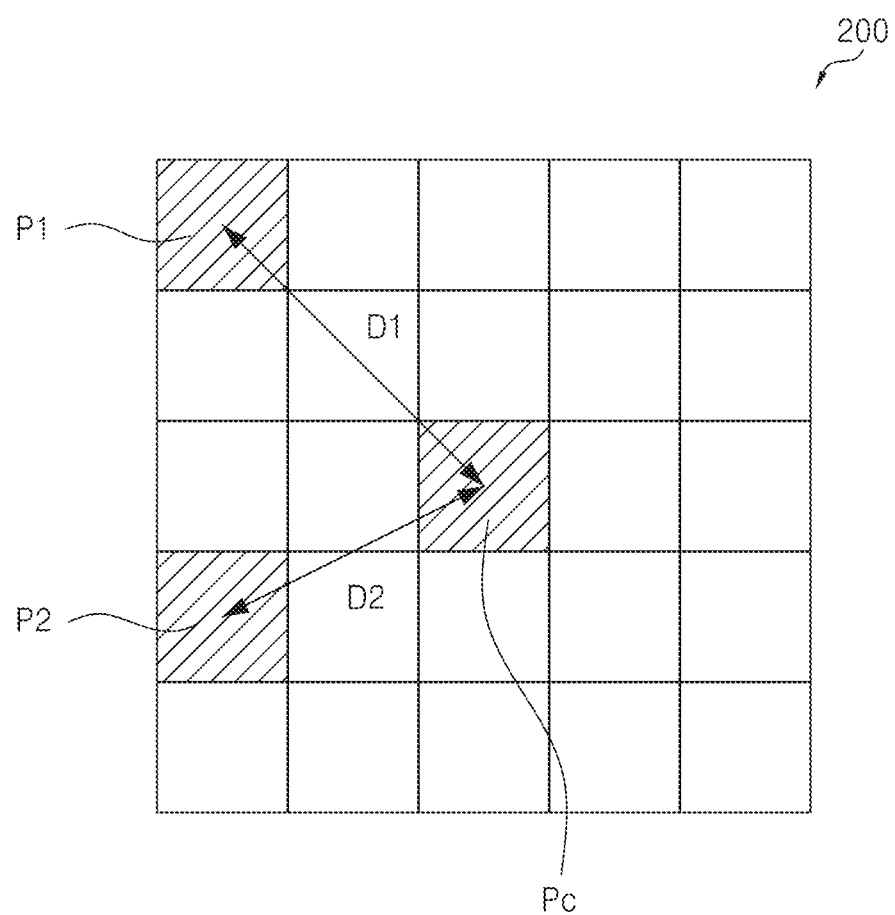
FIG. 2 is a drawing for explaining an operation of a weighted low-pass filter illustrated in FIG. 1.

FIG. 2 is a drawing for explaining an operation of the weighted low-pass filter illustrated in FIG. 1. Referring to FIGS. 1 and 2, the weighted low-pass filter 2 performs weighted low-pass filtering on a sub-sampled illumination signal I and outputs a weighted low-pass filtered illumination signal I1.

More specifically, an illumination value I1(bi, bj) of the weighted low-pass filtered illumination signal I may be acquired through an equation 1.

$$I1(bi, bj) = \sum_{k=-2}^{2} \sum_{l=-2}^{2} w1(bi, bj) \cdot w2(k, l) \cdot I(bi, bj)$$

$$w1 \propto \left| \frac{1}{k \times l} \right|,$$

$$w2 \propto \left| \frac{1}{I(bi, bj) - I(bi+k, bj+l)} \right|$$

Equation 1

Here, I(bi, bj) is an illumination value of a sub-sampled illumination signal I output from a sub pixel (Pc: hereinafter, it is called a center sub-pixel) located at a predetermined location, e.g., a center, among a plurality of sub pixels each outputting a sub-sampled illumination signal I.

I(bi+k, bj+l) is an illumination value of a sub-sampled illumination signal I output from at least a sub pixel (e.g., P1 or P2) located nearby among a plurality of sub pixels each outputting a sub-sampled illumination signal I.

The (bi, bj) means index of a pixel outputting a sub-sampled illumination signal I. Here, i, j, k and l are natural numbers.

As explained in the equation 1, the weighted low-pass filter 2 performs weighted low-pass filtering on a sub-sampled illumination signal I by applying a first weight W1, which is in inverse proportion to distance (e.g., D1 or D2) between the at least a sub pixel (e.g., P1 or P2) and the center sub pixel Pc, to the sub-sampled illumination signal I.

As explained in the equation 1, the weighted low-pass filter 2 performs weighted low-pass filtering on the sub-sampled illumination signal I by applying a second weight W2, which is in inverse proportion to a square of an absolute value of difference between an illumination value of the sub-sampled illumination signal I and an illumination value of a sub-sampled illumination signal output from the center sub pixel Pc, to the sub-sampled illumination signal I.

According to an aspect of this exemplary embodiment, each weight W1 or W2 of the weighted low-pass filter 2 may be set in advance by hardware or software.

The equation 1 shows an illumination value I1(bi, bj) of a weighted low-pass filtered illumination signal I obtained by performing weighted low-pass filtering on a pixel block 200, which has a size of p×q (here, p=q), e.g., 5×5.

A histogram generator 3 generates a histogram H from the weighted low-pass filtered illumination signal I1. A cache memory 4 stores the weighted low-pass filtered illumination signal I1 and outputs it to the weighted illumination interpolation circuit 6. In addition, the cache memory 4 stores the histogram H, which is generated by the histogram generator 3, and outputs it to a histogram equalization unit 7. According to an aspect of this exemplary embodiment, the cache memory 4 may be a static random access memory (SRAM).

The histogram equalization unit 7 generates a first mapping curve by using the histogram H output from the cache memory 4. The first mapping curve f(x) is generated through a process of histogram equalization by using the histogram H output from the cache memory 4.

For example, the histogram equalization unit 7 may calculate a Cumulative Distribution Function (CDF) by histogram from the histogram H according to an equation 2.

The histogram equalization unit 7 may calculate a first mapping curve, which is a linear expression of a cumulative function, based on the calculated cumulative distribution function.

$$CDF(X_k) = \sum_{j=0}^{k} p(X_j)$$

Equation 2

CDF(Xk) is a cumulative distribution function, P(Xj) is a normalized histogram, and Xk is a $k^{th}$ gray level. Here, k is 0, 1, 2, . . . , or L−1 and L is a natural number.

$$f(x) = X_k \times CDF(X_k)$$

Equation 3

Here, f(x) is a first mapping curve, CDF (Xk) is a cumulative distribution function, and Xk is a $k^{th}$ gray level.

According to an aspect of this exemplary embodiment, the histogram equalization unit 7 may generate a second mapping curve which is set by hardware or software. Here, the second mapping curve may be generated by using a user-defined one to one mapping function. The one to one mapping function may be defined as any of various functions according to a user.

Figure 3:
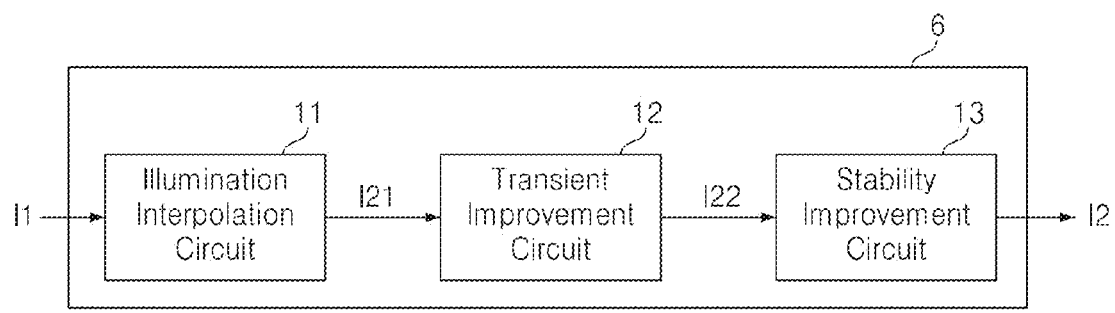
FIG. 3 is a schematic block diagram of the weighted illumination interpolation circuit illustrated in FIG. 1.
Figure 4:
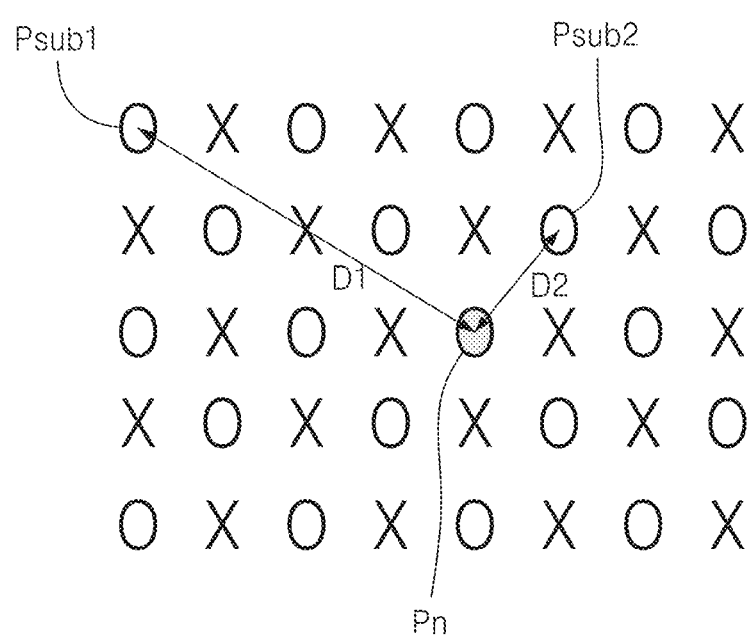
FIG. 4 is a drawing for explaining an operation of the weighted illumination interpolation circuit illustrated in FIG. 3.

FIG. 3 is a schematic block diagram of a weighted illumination interpolation circuit illustrated in FIG. 1, and FIG. 4 is a drawing for explaining an operation of the weighted illumination interpolation circuit illustrated in FIG. 3. Referring to FIGS. 1, 3 and 4, the weighted illumination interpolation circuit 6 compares a weighted low-pass filtered illumination signal I1 with an input luminance signal Yin or Yin' and outputs a weighted illumination-interpolated illumination signal I2 by performing an interpolation while applying a weight to the weighted low-pass filtered illumination signal I1 according to the comparison result.

According to an aspect of this exemplary embodiment, the weighted illumination interpolation circuit 6 may include an illumination interpolation circuit 11, a transient improvement circuit 12 and a stability improvement circuit 13.

An illumination value I2(i, j) of the weighted illumination-interpolated illumination signal I2 may be acquired through the following equation 4.

$$I2(i, j) = \sum_{k=-2}^{2} \sum_{l=-2}^{2} w3(i+k, j+l) \cdot w4(i+k, j+l) \cdot I1(i,j) \quad \text{Equation 4}$$

$$w3 \propto \left|\frac{1}{k \times l}\right|^m,$$

$$w2 \propto \left|\frac{1}{Yin(i,j) - I(bi+k, bj+l)}\right|^n$$

Here, I1(i, j) is an illumination value of the weighted low-pass filtered illumination signal I1, and (i, j) is index of a current pixel outputting an input luminance signal Yin.

Yin(i, j) is a luminance value of the input luminance signal Yin, and I(bi+k, bj+1) is an illumination value of a weighted low-pass filtered illumination signal I1, which is output after performing weighted low-pass filtering on a signal output from at least a sub pixel (e.g., Psub1 or Psub2) being located around a location Pn of a current pixel, outputting the input lamination signal Yin, and outputting at least a sub-sampled illumination signal.

As explained in equation 4, the weighted illumination interpolation circuit 6 performs interpolation while applying a third weight W3, which is in inverse proportion to m squares (here, m is a natural number) of distance (e.g., D1 or D2) between a location of a sub sampled illumination signal and a current pixel Pn outputting an input luminance signal Yin, to the weighted low-pass filtered illumination signal I1.

As explained in equation 4, the weighted illumination interpolation circuit 6 performs interpolation while applying a fourth weight W4, which is in inverse proportion to n squares (here, n is a natural number) of an absolute value of difference between an illumination value of a weighted low-pass filtered illumination signal I1 and a luminance value of an input luminance signal Yin output from a current pixel Pn, to the weighted low-pass filtered illumination signal I1, and outputs an illumination-interpolated illumination signal I21. According to an example embodiment, each weight W3 or W4 of the weighted illumination interpolation circuit 6 may be set in advance by hardware or software.

A transient improvement circuit 12 may improve transient of the weighted illumination-interpolated illumination signal I21, i.e., a phenomenon of an output image that the output image looks blurred on an edge where illumination is discontinuous, and output a transient-improved illumination signal I22.

For example, the transient improvement circuit 12 outputs a maximum value among illumination values of the weighted illumination-interpolated illumination signal I21 as a transient improved illumination signal I22 when a luminance value of the input luminance signal Yin is greater than an illumination value of the weighted illumination-interpolated illumination signal I21, and outputs a minimum value among illumination values of the weighted illumination-interpolated illumination signal I21 as the transient improved illumination signal I22 when a luminance value of the input luminance Yin is smaller than an illumination value of the weighted illumination-interpolated illumination signal I21.

A stability improvement circuit 13 may apply a predetermined ratio to each of the transient improved illumination signal I22 and the input luminance Yin or Yin', and output a result of adding the transient improved illumination signal I22 and the input luminance Yin or Yin', which have the predetermined ratio, as an improved illumination signal I2 in order to improve stability of an illumination value of the transient improved illumination signal I22.

An illumination value Is(i, j) of the stability-improved illumination signal I2 may be acquired through the following equation 5.

$$Is(i,j) = a1 \times I2(i,j) + (1-a1) \times Yin(i,j) \quad \text{Equation 5}$$

Here, a1 is a coefficient which determines a ratio between illumination of the transient improved illumination signal I22 and the input luminance Yin or Yin'.

The illumination generator 8 outputs an illumination-improved illumination signal I3 from a weighted illumination-interpolated illumination signal I2 by using a first mapping curve and a second mapping curve which are output from the histogram equalization unit 7. Here, the output F includes the first mapping curve and the second mapping curve.

An illumination value I3(i, j) of the illumination-improved illumination signal I3 may be acquired through the following equation 6.

$$I3(i,j) = a2 \times UDF[I2(i,j)] + (1-a2) \times HE[I2(i,j)] \quad \text{Equation 6}$$

Here, a2 is a coefficient determining a ratio between the first mapping curve and the second mapping curve which are generated through the histogram equalization unit 7.

The luminance generator 9 outputs a first output luminance signal Y1 by using the illumination-improved illumination signal I3 output from the illumination generator 8, the illumination-interpolated illumination signal I2 output from the weighted illumination interpolation circuit 6, and the input luminance Yin.

A luminance value Y(i, j) of the first output luminance signal Y1 may be acquired through the following equation 7.

$$Y(i, j) = Yin(i, j) \times \frac{I3(i, j)}{I2(i, j)} \quad \text{Equation 7}$$

Here, Yin(i,j) is a luminance value of the input luminance signal Yin, I2(i, j) is an illumination value of the illumination-interpolated illumination signal I2, and I3(i, j) is an illumination value of the illumination-improved illumination signal I3.

According to an aspect of this exemplary embodiment, an image processing device 100 may further include a contrast enhancement circuit 10. The contrast enhancement circuit 10 may output a contrast-enhanced second output luminance signal Y2 by using a bandpass filter to increase contrast of the first output luminance signal Y1.

Figure 5:
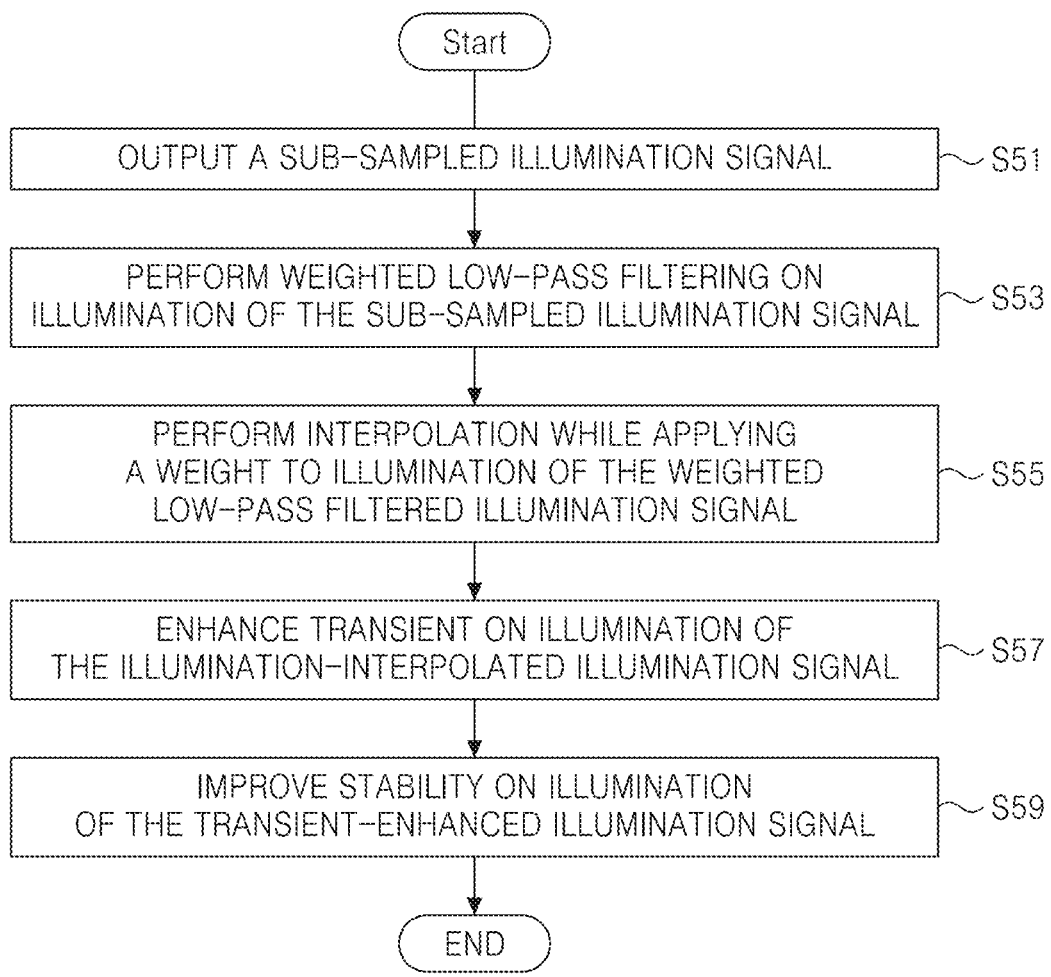
FIG. 5 is a flowchart for explaining an image processing method of the image processing device illustrated in FIG. 1.

FIG. 5 is a flowchart for explaining an image processing method of the image processing device illustrated in FIG. 1. Referring to FIGS. 1 and 5, a sub-sampled illumination signal I is output from an input luminance signal Yin by using a sub-sampling illumination generator 1 (S51).

Weighted low-pass filtering is performed on the sub-sampled illumination signal I by using the weighted low-pass filter 2 (S53). By using the weighted illumination-interpolated circuit 6, the weighted low-pass filtered illumination signal I1 and the input luminance signal Yin are compared and interpolation is performed while a weight is applied to the weighted low-pass filtered illumination signal I1 according to the comparison result (S55). According to an aspect of an exemplary embodiment, transient of the weighted illumination-interpolated illumination signal I21 may be enhanced by using the transient improvement circuit 12 (S57).

Moreover, by using the stability improvement circuit 13, stability of illumination 122 of a transient enhanced pixel signal may be improved (S59).

Figure 6:
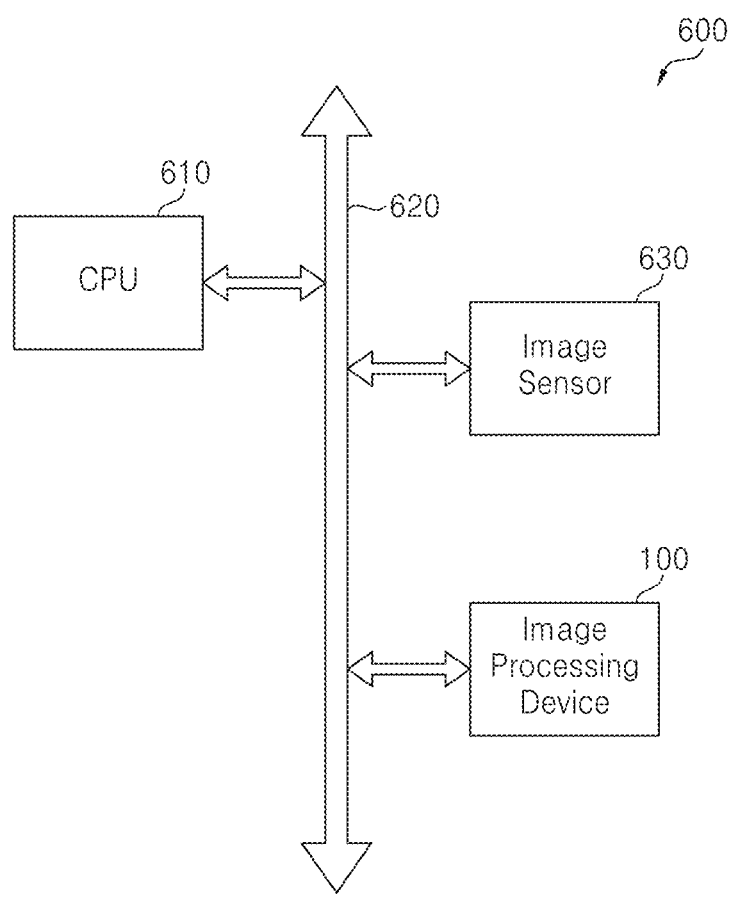
FIG. 6 is a drawing for explaining an image processing system including the image processing device illustrated in FIG. 1.

FIG. 6 is a drawing for explaining an image processing system including the image processing device illustrated in FIG. 1. An image processing system 600 may be embodied by, for example, a computer system, a camera system, a scanner, a navigation system, a video phone, a monitoring system, an auto-focus system, a tracking system, an operation inspection system or an image stabilization system.

Referring to FIGS. 1 and 6, a computer system which is an example of the image processing system 600 may include a bus 620, a central processing unit 610, an image sensor 630 and an image processing device 100.

The image processing system 600 may further include an interface (not shown) which is connected to the bus 620 and with which the image processing system 600 may communicate with outside. Here, the interface may be an I/O interface or a wireless interface, for example. A CPU 610 may generate a control signal controlling an operation of an image sensor 630, and supply the control signal to the image sensor 630 through the bus 620.

The image sensor 630 may convert an optical image into an electrical signal. The image processing device 100 is supplied with an electrical signal output from the image sensor through the bus 620 and processes it.

An image processing method of an image processing device according to an aspect of an exemplary embodiment may acquire a picture quality-improved image by correcting an illumination signal while applying a weight to each input signal of a low-pass filter and an illumination interpolation circuit.

Although a few exemplary embodiments have been shown and described, it will be appreciated by those skilled in the art that changes may be made in these embodiments without departing from the principles and spirit of the general inventive concept, the scope of which is defined in the appended claims and their equivalents.

What is claimed is:

1. An image processing method of an image processing device comprising:
   generating and outputting a sub-sampled illumination signal based on an input luminance signal by using a sub-sampling illumination generator;
   performing weighted low-pass filtering on the sub-sampled illumination signal and outputting a weighted low-pass filtered illumination signal by using a weighted low-pass filter; and
   comparing the weighted low-pass filtered illumination signal with the input luminance signal and performing interpolation while applying a weight to the weighted low-pass filtered illumination signal according to a result of the comparing by using a weighted illumination interpolation circuit.

2. The method of claim 1, wherein the performing weighted low-pass filtering comprises applying a weight, which is in inverse proportion to a distance between a sub pixel associated with the sub-sampled illumination signal and a center sub pixel, to the sub-sampled illumination signal.

3. The method of claim 1, wherein the performing weighted low-pass filtering comprises applying a weight, which is in inverse proportion to an illumination difference between the sub-sampled illumination signal and a sub-sampled illumination signal output from a center sub pixel, to the sub-sampled illumination signal.

4. The method of claim 1, further comprising setting a weight of the weighted low-pass filter.

5. The method of claim 1, wherein the weight applied by the weighted illumination interpolation circuit is in inverse proportion to distance between a location of the sub-sampled illumination signal and a current pixel outputting the input luminance signal.

6. The method of claim 1, wherein the weight applied by the weighted illumination interpolation circuit is in inverse proportion to an absolute value of difference between an illumination of the weighted low-pass filtered illumination signal and a luminance of the input luminance signal output from a current pixel.

7. The method of claim 1, further comprising setting the weight applied by the weighted illumination interpolation circuit.

8. An image processing device comprising:
   a sub-sampling illumination generator which generates and outputs a sub-sampled illumination signal based on an input luminance signal;
   a weighted low-pass filter which performs weighted low-pass filtering on the sub-sampled illumination signal and outputs a weighted low-pass filtered illumination signal; and
   a weighted illumination interpolation circuit which compares the weighted low-pass filtered illumination signal with the input luminance signal and performs interpolation while applying a weight to the weighted low-pass filtered illumination signal according to a result of the comparison.

9. The device of claim 8, wherein the weighted low-pass filter performs weighted low-pass filtering on the sub-sampled illumination signal by applying a weight, which is in inverse proportion to a distance between a sub pixel associated with the sub-sampled illumination signal and a center sub pixel, to the sub-sampled illumination signal.

10. The device of claim 8, wherein the weighted low-pass filter performs the weighted low-pass filtering by applying a weight, which is in inverse proportion to an illumination difference between the sub-sampled illumination signal and a sub-sampled illumination signal output from the center sub pixel, to the sub-sampled illumination signal.

11. The device of claim 8, wherein the weighted illumination interpolation circuit performs interpolation while applying a weight, which is in inverse proportion to a distance between a sub pixel associated with the sub-sampled illumination signal and a current pixel outputting the input luminance signal, to the weighted low-pass filtered illumination signal.

12. The device of claim 8, wherein the weighted illumination interpolation circuit performs interpolation while applying a weight, which is in inverse proportion to an absolute value of a difference between an illumination of the weighted low-pass filtered illumination signal and a luminance of the input luminance signal output from a current pixel, to the weighted low-pass filtered illumination signal.

13. An image processing system comprising:
   an image sensor; and the image processing device of claim 8 which processes a signal received from the image sensor.

14. An image processing device comprising:

a weighted low-pass filter which receives a sub-sampled illumination signal based on an input luminance signal which is a luminance value of a current pixel of an input image;

a weighted low-pass filter which generates a weighted low-pass filtered illumination signal from the sub-sampled illumination signal;

a histogram generator which generates a histogram from the weighted low-pass filtered illumination signal; and a weighted illumination interpolation circuit which determines an illumination value $I2(i,j)$ of the weighted illumination-interpolated illumination signal $I2$, wherein $(i,j)$ is an index of the current pixel, $Yin(i,j)$ is a luminance value of the input luminance signal, $I(bi+k, bj+l)$ is an illumination value of the weighted low-pass filtered illumination signal, $w3$ is a weight which is in inverse proportion to a distance between a location of the sub-sampled illumination signal and a current pixel outputting the input luminance signal $w4$ is a weight which is in inverse proportion to an illumination difference between the luminance value of the input luminance signal and the illumination value of the weighted low-pass filtered illumination signal, such that:

$$I2(i,j) = \sum_{k=-2}^{2} \sum_{l=-2}^{2} w3(i+k, j+l) \cdot w4(i+k, j+l) \cdot I1(i,j)$$

$$w3 \propto \left|\frac{1}{k \times l}\right|^m,$$

$$w2 \propto \left|\frac{1}{Yin(i,j) - I(bi+k, bj+l)}\right|^n.$$

15. The image processing device of claim 14, wherein the weighted illumination interpolation circuit improves a transient of the weighted illumination-interpolated illumination signal and outputs a transient-improved illumination signal.

16. The image processing device of claim 15, wherein the weighted illumination interpolation circuit applies a predetermined ratio to the transient improved illumination signal and the input luminance signal and outputs a result of adding the transient improved illumination signal and the input luminance signal.

* * * * *